(12) United States Patent
Ogasawara

(10) Patent No.: US 7,895,636 B2
(45) Date of Patent: Feb. 22, 2011

(54) APPARATUS FOR OUTPUTTING CONTENT

(75) Inventor: Tsutomu Ogasawara, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 632 days.

(21) Appl. No.: 11/344,401

(22) Filed: Jan. 31, 2006

(65) Prior Publication Data

US 2006/0195879 A1 Aug. 31, 2006

(30) Foreign Application Priority Data

Jan. 31, 2005 (JP) ............................ 2005-023742
Jan. 31, 2005 (JP) ............................ 2005-023743

(51) Int. Cl.
*H40N 7/16* (2006.01)
(52) U.S. Cl. ...................... 725/141; 725/139
(58) Field of Classification Search ................. 725/139, 725/141
See application file for complete search history.

(56) References Cited

U.S. PATENT DOCUMENTS

| | | | |
|---|---|---|---|
| 6,401,179 B1 * | 6/2002 | Park | 711/165 |
| 2003/0050980 A1 * | 3/2003 | Dutta et al. | 709/205 |
| 2005/0198663 A1 * | 9/2005 | Chaney et al. | 725/38 |

FOREIGN PATENT DOCUMENTS

| | | |
|---|---|---|
| JP | 2001144779 | 5/2001 |
| JP | 2001-176249 A | 6/2001 |
| JP | 2002150754 | 5/2002 |
| JP | 2002185874 | 6/2002 |
| JP | 2002209154 | 7/2002 |
| JP | 3090788 | 10/2002 |
| JP | 2002359787 | 12/2002 |
| JP | 2004128597 | 4/2004 |
| JP | 2005020104 | 1/2005 |

OTHER PUBLICATIONS

Notice of Rejection for Japanese Patent Application No. 2005-023742 dated Oct. 7, 2008 (with Partial Translation).
Partial Translation of Notice of Rejection for Japanese patent Application No. 2005-023743 dated on Jun. 17, 2008.

* cited by examiner

*Primary Examiner*—Scott Beliveau
*Assistant Examiner*—Mark P Stanley
(74) *Attorney, Agent, or Firm*—Lerner, David, Littenberg, Krumholz & Mentlik, LLP

(57) ABSTRACT

In a content output apparatus which is connected to at least one content playback apparatus, lists of content which are respectively reproducible by the connected content playback apparatuses are acquired. When the acquired lists of the content are output in order for a user to select any of the listed content, the content playback apparatus capable of playing back the selected content is specified, and a playback instruction signal for instructing the specified content playback apparatus to play back the selected content is output so as to output a signal which is pertinent to the content played back by the content playback apparatus. As a result, the content output apparatus is more convenient to use.

3 Claims, 5 Drawing Sheets

| CONTENT PLAYBACK APPARATUS | TERMINAL SET |
|---|---|
| xxx . xxx . xxx . xxx | A |
| yyy . yyy . yyy . yyy | B |
| ⋮ | ⋮ |

FIG. 4

| CONTENT IDENTIFIER | DATE OF VIDEO RECORDING | CONTENT IDENTIFIER | DATE OF VIDEO RECORDING |
|---|---|---|---|
| 1ch | ——— | aaaaa | 2005.1.1 |
| 3ch | ——— | bbbbb | 2005.1.3 |
| 4ch | ——— | ⋮ | ⋮ |
| ⋮ | ⋮ | | |

CURSOR → (pointing to 1ch row)

APPARATUS FOR OUTPUTTING CONTENT

CROSS-REFERENCE TO RELATED APPLICATIONS

The present application claims priority from Japanese Application Nos. JP2005-023742, filed Jan. 31, 2005, and JP2005-023743, filed Jan. 31, 2005, the disclosures of which are hereby incorporated by reference herein.

BACKGROUND OF THE INVENTION

The present invention relates to a content output apparatus such as a television receiver, which outputs content including audio/video signals, etc.

In recent years, audio/video (AV)-related apparatuses for domestic use have diversified and have come into wide use. By way of example, it is general to connect a large number of AV apparatuses, such as a video cassette recorder, hard disk recorder, DVD recorder and domestic game machine, to a television receiver.

In such a situation, in a case, for example, where a user wants to view content recorded on a DVD, the user first manipulates the television receiver so as to select an input signal from the DVD recorder. Subsequently, the user manipulates the DVD recorder and causes it to display the list of content recorded on the DVD. Further, the user selects the desired content and causes the DVD recorder to play back the selected content. This is inconvenient for the user for such reasons that the user needs to manipulate the corresponding AV apparatus on each occasion, and that the user needs to perform the manipulation of changing-over input signals in the television receiver.

Incidentally, JP-A-2001-176249 discloses a technique wherein, in a television receiver having a built-in video CD playback apparatus, when the video CD playback apparatus has been selected by a user, a drive control is performed for the video CD playback apparatus, and simultaneously, the input switch of video signals is thrown onto the side of the video CD playback apparatus.

SUMMARY OF THE INVENTION

The present invention has been made in view of the above circumstances, and has as one of its objects to provide a content output apparatus which is more convenient.

A content output apparatus according to the invention includes a plurality of input terminals which accept signal inputs from a plurality of content playback apparatuses, respectively, and a communication unit which outputs image display instructions to the respective content playback apparatuses, wherein a predetermined process is executed for identifying the content playback apparatuses which are respectively connected to the input terminals.

BRIEF DESCRIPTION OF THE DRAWINGS

FIG. 4 is an explanatory diagram showing a display example of the list of content;

DETAILED DESCRIPTION

Figure 1:
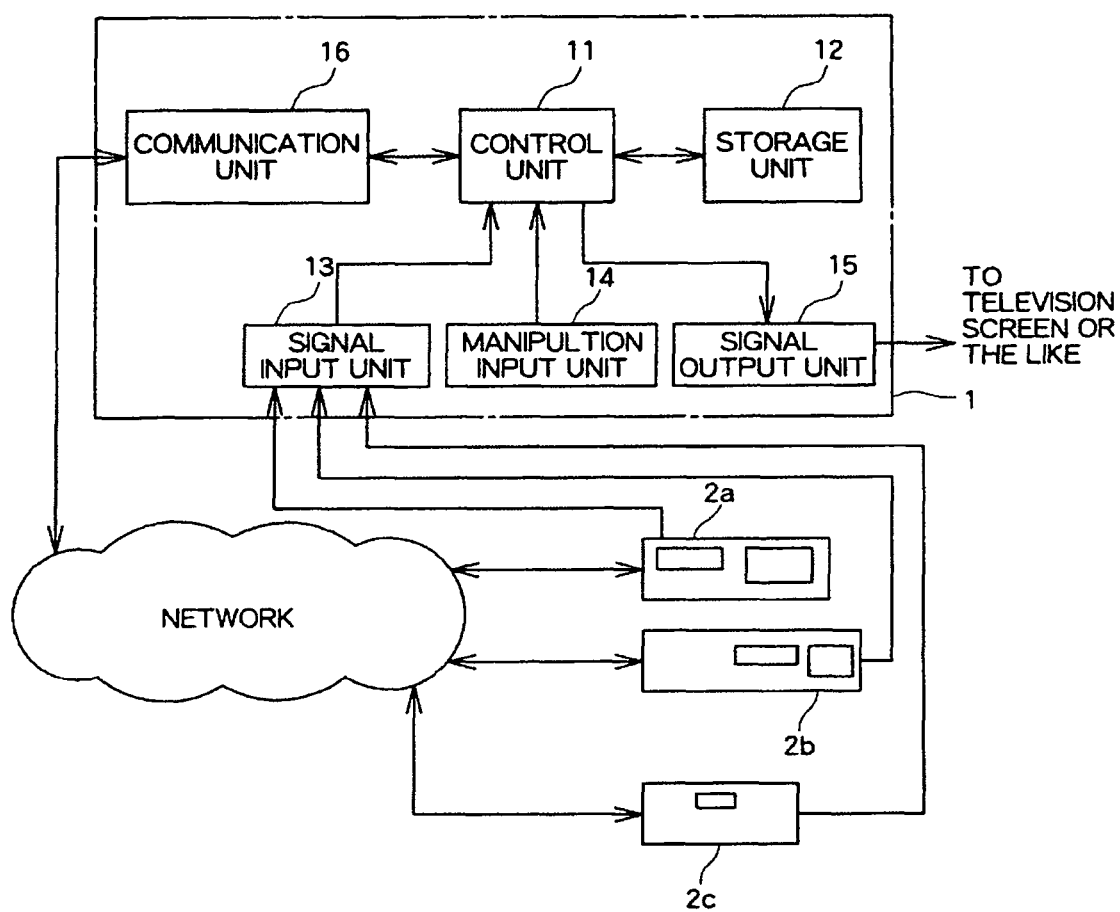
FIG. 1 is a constituent block diagram showing a content output apparatus according to an embodiment of the present invention, and examples of content playback apparatuses.

An embodiment of the present invention will be described with reference to the drawings. As shown in FIG. 1, a content output apparatus 1 according to the embodiment of the invention is configured including a control unit 11, a storage unit 12, a signal input unit 13, a manipulation input unit 14, a signal output unit 15, and a communication unit 16. Besides, the content output apparatus 1 is connected to at least one content playback apparatus 2. For the sake of the ensuing description, it is assumed that the content output apparatus 1 is built in a television receiver, and that a video tape recorder 2a, a DVD player 2b and a satellite broadcast tuner 2c are connected as the content playback apparatuses 2. However, this embodiment is not restricted to such an example, but the content output apparatus 1 may well be, for example, an AV selector which controls an output to a monitor for a video signal, etc. Besides, the content playback apparatuses 2 may well include various ones, such as a hard disk recorder and a domestic game equipment, in addition to the above examples.

The control unit 11 of the content output apparatus 1 can be, for example, a CPU. This control unit 11 operates in accordance with programs which are stored in the storage unit 12. In this embodiment, the control unit 11 executes a process for acquiring a list of content which are reproducible or can be played back in the content playback apparatuses, a process for presenting the list of the content and for accepting the selection of the content from within the presented list, a step of outputting a playback instruction for the selected content, and a process for outputting signals which conform to the content input from the content playback apparatus. The concrete exemplary content of these processes of the control unit 11 will be explained in detail later.

The storage unit 12 stores therein the programs which are run by the control unit 11. This storage unit 12 is configured including a memory element, for example, RAM or ROM. Besides, the storage unit 12 operates also as the work memory of the control unit 11.

The signal input unit 13 is furnished with at least one terminal set being input terminals which accept the inputs of content signals. The terminal set includes, for example, the input terminals of video signals and the input terminals of stereo audio signals. The manipulation input unit 14 includes, for example, an infrared reception portion which accepts an instruction from a remote-controller. This manipulation input unit 14 outputs the information of the accepted instruction to the control unit 11. The signal output unit 15 is furnished with a group of output terminals which output the video signal and the audio signal, or the like as content signals. The output signals from the group of output terminals are connected to, for example, the television receiver itself or a loudspeaker.

The communication unit 16 is, for example, a network interface that transmits data through a network in compliance with an instruction input from the control unit 11. Besides, it receives data arriving through the network and outputs the data to the control unit 11. Incidentally, for the sake of brevity, it is assumed here that only the content output apparatus 1 and the content playback apparatuses 2 are connected to the network, and that any other device (for example, a modem device for communications with the Internet) is connected to another network through a router, a gateway or like device (in other words, so as to prevent a broadcast signal from arriving). The network here may also be, for example, an "Ethernet" or a network conforming to a serial communication scheme such as the "IEEE1394" (a network of "IPoverIEEE1394" or a network of daisy chain).

The content playback apparatuses 2 output the video and audio signals of the respectively corresponding content. By way of example, the video tape recorder 2a and the DVD player 2b read and output the video and audio signals recorded on a video tape and a DVD, respectively. Besides, the satellite broadcast tuner 2c receives the broadcast signal of a channel designated by a user, and it demodulates and outputs the video and audio signals from the received broadcast signal.

Moreover, the content playback apparatuses 2 display designated images (which may be pattern images, for example, an image which is entirely in the color of red, etc.) in compliance with an instruction input from the content output apparatus 1.

Further, each of the content playback apparatuses 2 may well receive a request for the list of reproducible content from the content output apparatus 1, generate the list of the reproducible content, and output the generated list to the content output apparatus 1. That is, the content playback apparatus 2 in this embodiment may well be furnished with a network interface (not shown) so as to transmit data to and receive data from the content output apparatus 1 through the network.

By way of example, the video tape recorder 2a records unique identifiers on respective recorded video tapes. The identifiers are stored in, for example, a nonvolatile storage element such as EEPRROM, as a video recording database in association with recorded content (dates of video recording, video-recording time periods, or the like) on the video tapes identified by these identifiers. Here, when the video tape recorder 2a receives the request for the list, it reads out the information of the recorded content which is associated with the identifier of the video tape currently set, with reference to the video recording database, and it transmits and outputs the read-out information to the content output apparatus 1.

When the DVD player 2b receives the request for the list, it reads out the information (such as title) of an index recorded on the set DVD medium, and transmits and outputs the read-out information to the content output apparatus 1.

Further, when the satellite broadcast tuner 2c receives an instruction for making the request for the list of content from the content output apparatus 1, it may well generate the list of the information items of programs which are being broadcast in individual receivable channels on the basis of so-called "EPG (Electronic Program Guide) information", and then transmit and output the generated list to the content output apparatus 1.

Instead of requesting the satellite broadcast tuner 2c to transmit the list of the content and thus receiving the list of the information items of the programs, the content output apparatus 1 may receive the EPG information through the Internet (as so-called "iEPG") so as to acquire the list of the information items of the programs which are being broadcast in the receivable channels of the satellite broadcast tuner 2c.

Further, the content playback apparatus 2 receives the designation of content to-be-played-back (playback instruction signal) from the content output apparatus 1, plays back the designated content, and outputs the video and audio signals of the content to the signal input unit 13 of the content output apparatus 1.

By way of example, when the content to be played back is designated, the DVD player 2b reads out the video and audio signals of the pertinent content from the DVD and outputs them to the content output apparatus 1. When a channel is designated as the content to-be-played-back, the satellite broadcast tuner 2c receives the broadcast signal of the designated channel and outputs the video and audio signals of the broadcast signal to the content output apparatus 1. Also, the video tape recorder 2a performs the reading of the content to-be-played-back by utilizing the video recording database which is stored in the built-in nonvolatile memory, or a VISS (Video Index Search System) which is extensively known, whereupon it starts the playback.

Next, there will be described content examples of the concrete processes of the control unit 11. The control unit 11 acquires the lists of content which are respectively reproducible by the connected content playback apparatuses 2a, 2b, . . . . This control unit 11 acquires the lists by, for example, requesting the content playback apparatuses 2 to present these lists and receiving the presentations of these lists from the content playback apparatuses 2.

Alternatively, the control unit 11 can acquire the lists of the reproducible content by storing these lists in the storage unit 12 beforehand and reading out these lists from the storage unit 12. Regarding, for example, the satellite broadcast tuner 2c, the list of channels receivable by this satellite broadcast tuner 2c may well be stored in the storage unit 12 beforehand and be presented, without making the request for the list of the content by the control unit 11.

Figures 2, 3:
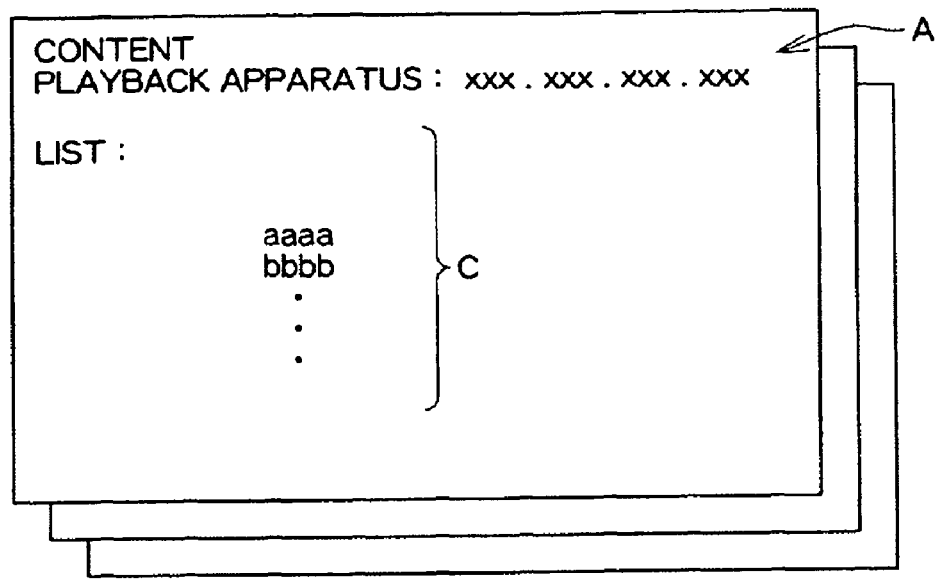
FIG. 2 is an explanatory diagram showing an example of a content list database.
FIG. 3 is an explanatory diagram showing an example of the content of a connection state database.

In this way, the control unit 11 acquires the lists of the content reproducible in the individual content playback apparatuses 2. Moreover, the control unit 11 associates the lists (C) of the reproducible content with respective information items (A) which specify the content playback apparatuses 2, and stores the lists as a content list database in the storage unit 12 (FIG. 2). The control unit 11 holds in the storage unit 12, a connection state database wherein the information items specifying the content playback apparatuses 2 are associated with information items specifying those terminal sets of the signal input unit 13 to which the respective content playback apparatuses 2 are connected (FIG. 3). By way of example, the connection state database is set by the user beforehand.

Incidentally, the connection state database may well be set in such a way that, after a playback instruction has been given to any content playback apparatus 2, the terminal set to which video and audio signals from the content playback apparatus 2 being the output destination of the playback instruction are being input is specified, so as to selectively output the input signals from the specified terminal set. A method of setting the connection state database will be explained in detail later.

Incidentally, the information specifying the content playback apparatus 2 here may be, for example, the network address of this content playback apparatus 2.

Further, the control unit 11 generates a screen which presents the lists, and it outputs the signal of the screen through the signal output unit 15. The television receiver in which the content output apparatus 1 of this embodiment is built displays on its screen, the lists of the content reproducible in the respective content playback apparatuses 2 (FIG. 4). When the control unit 11 receives the input of a movement instruction manipulation for a cursor from the manipulation input unit 14, it moves the cursor on the displayed lists. Besides, when the control unit 11 receives the input of a selection instruction manipulation from the manipulation input unit 14, it sets content indicated by the cursor as a selected content, and it acquires information which specifies the selected content.

The control unit 11 searches the content list database for the content playback apparatus 2 which is capable of playing back the selected content. Further, it specifies the content playback apparatus 2 for playing back the selected content on the basis of the result of the search. Moreover, it transmits to the specified content playback apparatus 2 an instruction (playback instruction signal) for designating the selected content and for making a request for the playback of the designated content.

Besides, the control unit 11 specifies the terminal set of the signal input unit 13 to which the specified content playback apparatus 2 is connected with reference to the connection state database. Further, it selectively outputs the signals input from the specified terminal set through the signal output unit 15.

Next, there will be described the operations of the content output apparatus 1 and the content playback apparatuses 2 in this embodiment. The user connects the content output apparatus 1 and the content playback apparatuses 2 to the network beforehand, respectively. The user connects the sets of the video/audio signal output terminals of the individual content playback apparatuses 2, with the terminal sets of the manipulation input unit 14 of the content output apparatus 1. Here, it is assumed that the video tape recorder 2a, DVD player 2b and satellite broadcast tuner 2c are respectively connected to terminal sets A, B and C. At this point in time, the user allocates unique network addresses to the communication unit 16 of the content output apparatus 1 and the network interfaces of the individual content playback apparatuses 2, respectively.

The user sets the connection state database in the content output apparatus 1. That is, the network addresses which are information items specifying the individual content playback apparatuses 2 are respectively associated with information items specifying the terminal sets which are the connection destinations of the content playback apparatuses 2 specified by the network addresses. By way of example, the content playback apparatuses 2 may well have external input channel Nos. associated with their respective terminal sets, so as to utilize the external input channel Nos. as the information items specifying the terminal sets.

The user sets a video tape and a DVD on the video tape recorder 2a and the DVD player 2b, respectively, whereupon the user instructs the content output apparatus 1 to display the lists of content.

Figure 5:
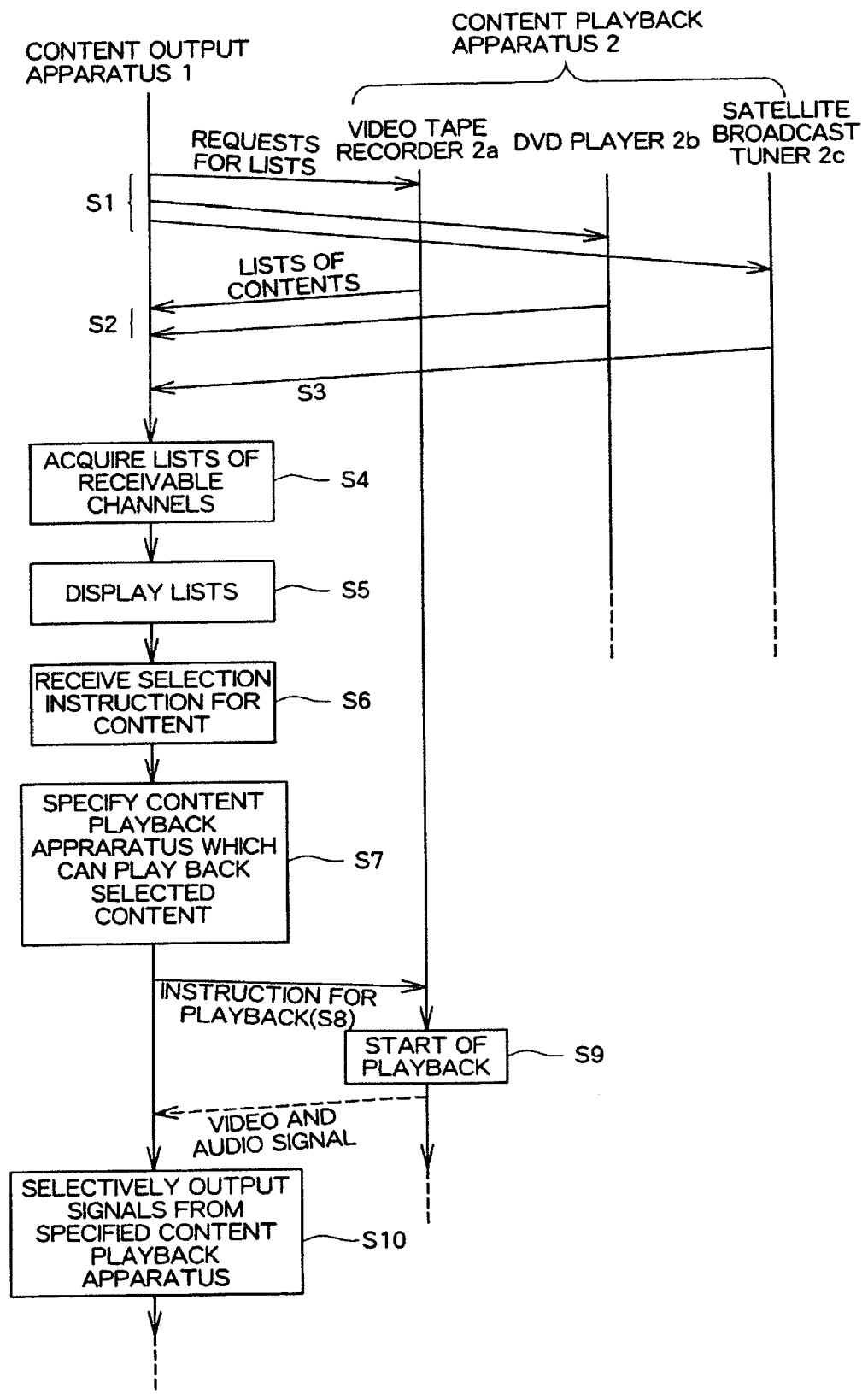
FIG. 5 is an explanatory diagram showing an example of the flow of processes which proceed between the content output apparatus and the content playback apparatuses.

As shown in FIG. 5, in compliance with the user's instruction, the content output apparatus 1 sends signals for making requests for the lists of the reproducible content to the content playback apparatuses 2 through the network (step S1). The request signals may be sent by, for example, broadcasting (simultaneous multiple addressing to all the apparatuses on the network).

Upon receiving the requests for the lists of the content, the content playback apparatuses 2 generate the lists of the reproducible content and send them to the content output apparatus 1, respectively (step S2). Incidentally, it is assumed here that, among the content playback apparatuses 2, the video tape recorder 2a and the DVD player 2b transmit the lists of the content, whereas the satellite broadcast tuner 2c is not endowed with the function of offering the list of the content. In this case, the satellite broadcast tuner 2c reports to the effect that the list cannot be offered (step S3).

The content output apparatus 1 receives the lists of the content which are reproducible in the video tape recorder 2a and DVD player 2b. Besides, regarding the satellite broadcast tuner 2c, the content output apparatus 1 receives the report to the effect that the list cannot be offered, and it reads out the list of the content reproducible in the satellite broadcast tuner 2c (the list of receivable channels) as is stored in the storage unit 12 beforehand (step S4).

Besides, the content output apparatus 1 outputs the lists of the content reproducible in the respective content playback apparatuses 2, to the television screen for display (step S5). The content output apparatus 1 receives from the user the input of a selection instruction for the content to-be-played-back from within the lists of the content (step S6), and it specifies the content playback apparatus 2 which is to play back the selected content (step S7). Here, it is assumed by way of example that the user has selected one of the content of the video tape recorder 2a. Besides, the content output apparatus 1 outputs to the specified content playback apparatus 2 (video tape recorder 2a), information which designates the selected content, and also an instruction to the effect that the designated content is to be played back (step S8).

When the video tape recorder 2a has received the inputs of the information specifying the content and the playback instruction for the designated content, it performs the reading of the designated content and starts the playback (step S9).

On the other hand, the content output apparatus 1 selectively outputs to and displays on the television receiver signals input from the terminal set A to which the video tape recorder 2a is connected (step S10).

Thus, the designated content of the video tape set on the video tape recorder 2a is played back.

According to this embodiment, the changeover of input signals from the content playback apparatuses 2 and the playback instruction for the content playback apparatus 2 are performed in association with the designation of the content, and these operations need not be individually performed by the user. Thus, the level of user-convenience can be enhanced.

By the way, in the description thus far made, it has been assumed that the connection state database is set by the user, but the content output apparatus 1 may well execute a process for aiding the user in the setting. Next, there will be described the aid process for setting the connection state database.

In order to execute the setting aid process, the content playback apparatuses 2 display designated images (which may be pattern images, for example, an image which is entirely in the color of red, etc.) in compliance with an instruction input from the content output apparatus 1.

The control unit 11 of the content output apparatus 1 acquires the network addresses (identification information items) of the connected content playback apparatuses 2. In a practical example for the acquisition, the content output apparatus 1 transmits an instruction to the effect that the network addresses are to be reported by broadcasting to all the content playback apparatuses 2 through the network. The content playback apparatuses 2 transmit the network addresses set for the respective apparatuses to the content output apparatus 1. Incidentally, the network addresses are collected by broadcasting here, but instead of this aspect, the content output apparatus 1 may well collect the network addresses of the content playback apparatuses 2 by performing communications in accordance with a protocol which is previously stipulated between the content output apparatus 1 and the content playback apparatuses 2.

The content output apparatus 1 receives the network addresses of all the content playback apparatuses 2, and stores them in the storage unit 12. Subsequently, the content output apparatus 1 instructs the content playback apparatuses 2 of the respective network addresses to display images different from one another. By way of example, the content output apparatus 1 may output the instructions in such a manner that the network address of the video tape recorder 2a is instructed to display an image which is entirely in the color of red, and that the network address of the DVD player 2b is instructed to display an image which is entirely in the color of blue.

Figure 6:
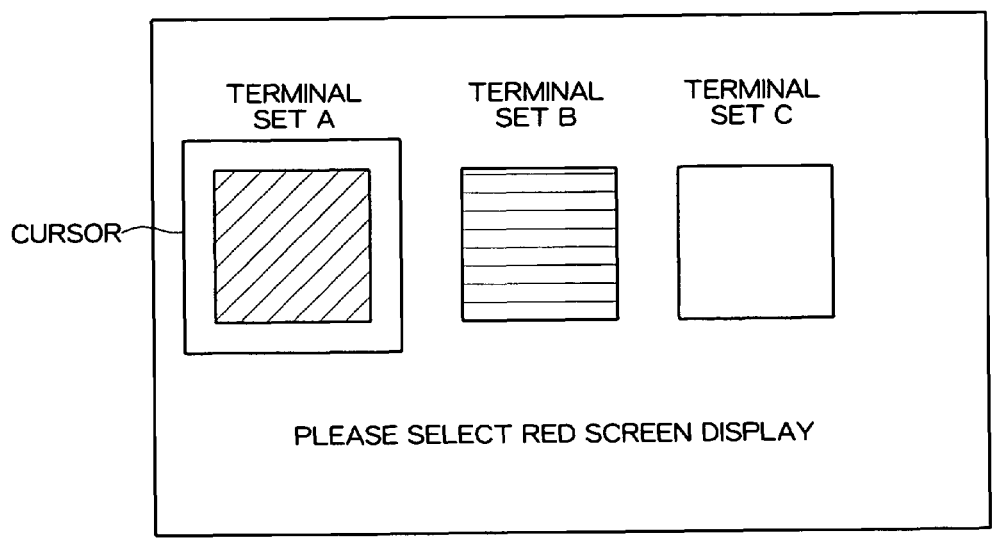
FIG. 6 is an explanatory diagram showing an example of a screen which serves to aid in creating the connection state database.

The content output apparatus 1 arrays the video/audio signals from the respective content playback apparatuses 2 as are input to the terminal sets, and it outputs the arrayed signals to the television receiver itself for display (FIG. 6).

The control unit 11 of the content output apparatus 1 requests the user to select each of the images which the respective content playback apparatuses 2 have been instructed to display. By way of example, the control unit 11 selects the content playback apparatuses 2 as subjects for identification, in succession, and requests the user to select the images designated for the selected content playback apparatuses 2. As a practical example, when the video tape recorder 2a is selected as the subject for the identification, the control unit 11 outputs to the television receiver itself and displays a character string for requesting the user to select the image designated for the video tape recorder 2a, for example, "PLEASE SELECT RED SCREEN DISPLAY". Also, it displays on the television receiver itself a cursor for selecting the image which is pertinent to the video signal from the corresponding content playback apparatus 2. The user performs a manipulation for moving the cursor, thereby to select the red screen display. The control unit 11 associates the information which specifies the terminal set corresponding to the selected screen display with the network address which corresponds to the video tape recorder 2a (the information which specifies the video tape recorder 2a), and stores the associated information items in the storage unit 12 as the connection state database.

Alternatively, the control unit 11 may well output the display instructions of predetermined images (for example, the image of a character string "PLEASE SELECT HERE", etc.) to the individual content playback apparatuses 2, whereby the user is allowed to select the predetermined images for the respective outputs of the display instructions. In this case, the user selects the images corresponding to the predetermined images from among the plurality of images which are pertinent to the video signals from the respective content playback apparatuses 2. The content output apparatus 1 associates the network addresses of the transmission destinations of the display instructions of the predetermined images with the information items which specify the terminal sets corresponding to the images selected by the user, and stores the associated information items in the storage unit 12 as the connection state database.

Incidentally, it is assumed here that the user selects the designated screen display in the video signal of the corresponding content playback apparatus 2, but instead of this aspect, the control unit 11 may well recognize the video signal from each content playback apparatus 2. By way of example, regarding a signal which has the largest red component in the video signals input from the individual terminal sets, information specifying the terminal set to which the signal is being input is associated with the network address having been instructed to display a red image, and the associated information items are stored in the storage unit 12 as the connection state database.

Further, it is assumed here that each content playback apparatus 2 is caused to display the image, but the control unit 11 may well execute a process as stated below. The control unit 11 sends each content playback apparatus 2 a signal to the effect that a power source is to be turned OFF, thereby to turn OFF the power source of the content playback apparatus 2. Subsequently, the control unit 11 outputs a signal to the effect that the power source is to be turned ON to one of the acquired network addresses, associates information specifying the terminal set from which a signal has been input with the network address being the output destination of the signal to the effect that the power source is to be turned ON so as to store the associated information items in the storage unit 12 as the connection state database, outputs a signal to the effect that the power source is to be turned OFF to the network address being the output destination of the signal to the effect that the power source is to be turned ON, and outputs a signal to the effect that a power source is to be turned ON to the next network address. In this manner, the content playback apparatuses 2 corresponding to the respective acquired network addresses are turned ON in succession, and the terminal sets from which signals have been input are associated with the network addresses.

Likewise, the control unit 11 may well execute a process as stated below. The control unit 11 sends each content playback apparatus 2 a signal to the effect that a power source is to be turned OFF, thereby to turn OFF the power source of the content playback apparatus 2. Subsequently, the control unit 11 outputs a signal to the effect that the power source is to be turned ON, to one of the acquired network addresses, allows the user to input information specifying the terminal set from which a signal has been input, acquires the information specifying the terminal set from which the signal has been input in accordance with the input manipulation by the user, associates the information specifying the terminal set with the network address being the output destination of the signal to the effect that the power source is to be turned ON so as to store the associated information items in the storage unit 12 as the connection state database, outputs a signal to the effect that the power source is to be turned OFF to the network address being the output destination of the signal to the effect that the power source is to be turned ON, and outputs a signal to the effect that a power source is to be turned ON to the next network address. In this manner, the content playback apparatuses 2 corresponding to the respective acquired network addresses are turned ON in succession, and the terminal sets from which signals have been input are associated with the network addresses through user's input manipulations.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A content output apparatus connected to a plurality of content playback apparatuses, the content output apparatus comprising:
   a storage unit;
   a request output device which transmits, to each one of the plurality of content playback apparatuses, a request for a list of content reproducible from that content playback apparatus, the plurality of content playback apparatuses being physically separated from the content output apparatus;
   a list acquisition device which, for each one of the plurality of content playback apparatuses, acquires from that content playback apparatus the list of content reproducible from that content playback apparatus in response to the request when that content playback apparatus is ordinarily provided with a function of providing the list of content reproducible by that content playback apparatus,
      wherein when that content playback apparatus is ordinarily not provided with the function of providing the list of content reproducible by that content playback apparatus, the list acquisition device (i) receives from that content playback apparatus a response that does not include the list of content reproducible from that content playback apparatus in response to the request, and then (ii) reads from the storage unit a stored list of the content reproducible from that content playback apparatus;

an output device which outputs the acquired list of content;

a playback instruction device which, in response to any of the listed content being selected by a user, specifies the content playback apparatus capable of playing back the selected content and outputs a playback instruction signal instructing the specified content playback apparatus to play back the selected content; and a signal output device which outputs a signal that is pertinent to the content played back by the content playback apparatus.

2. A content output apparatus as claimed in claim 1, wherein the signal output device selectively outputs an input signal from the content playback apparatus specified by the playback instruction device.

3. A content output apparatus, comprising:

a plurality of input terminals that correspond to a plurality of content playback apparatuses in a predefined one-to-one relationship such that a given one of the plurality of input terminals only accepts a signal inputted from its corresponding content playback apparatus;

a communication unit which outputs image display instructions to each one of the plurality of content playback apparatuses, the image display instructions including an instruction to that content playback apparatus to display an image that is unique to that content playback apparatus; and a control unit which executes a predetermined process for identifying the predefined one-to-one correspondence relationship between the plurality of content playback a plurality of input terminals that correspond to a plurality of content playback apparatuses being physically separate from the content output apparatus in a predefined one-to-one relationship such that a given one of the plurality of input terminals only accepts a signal inputted from its corresponding content playback apparatus;

apparatuses and the plurality of input terminals using signals inputted by each one of the content playback apparatuses through its corresponding input terminal in compliance with the instruction outputted to that content playback apparatus, and in the predetermined process, the control unit causes a plurality of images based on the inputted signals to be displayed, and instructs a user to select a particular image that corresponds to the identified content playback apparatus and thereby specify the predefined one-to-one correspondence relationship between the specific content playback apparatus and its corresponding input terminal, the predefined one-to-one relationship of the plurality of input terminals to the plurality of content playback apparatuses being defined prior to the control unit executing the predetermined process so that the predefined one-to-one relationship is already defined at the time the user is instructed to select the particular image.

* * * * *